(12) United States Patent  
Oglesbee et al.

(10) Patent No.: US 7,945,295 B2  
(45) Date of Patent: May 17, 2011

(54) PORTABLE RADIO AND BATTERY PACK CONFIGURATION

(75) Inventors: John W. Oglesbee, Watkinsville, GA (US); John E. Herrmann, Suwanee, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 593 days.

(21) Appl. No.: 11/949,214

(22) Filed: Dec. 3, 2007

(65) Prior Publication Data

US 2009/0143111 A1 Jun. 4, 2009

(51) Int. Cl.  
*H04M 1/02* (2006.01)

(52) U.S. Cl. .................. 455/572; 455/556.1; 455/575.6; 455/90.3

(58) Field of Classification Search ............. 455/571, 455/572, 41.2, 573, 343.1, 343.2, 90.3, 575.6; 381/315, 334  
See application file for complete search history.

(56) References Cited

U.S. PATENT DOCUMENTS

| 5,991,420 | A | * | 11/1999 | Stern | ............................. 381/315 |
| 2005/0079820 | A1 | * | 4/2005 | Yamashita | ................... 455/41.2 |
| 2007/0121981 | A1 | * | 5/2007 | Koh et al. | ..................... 381/334 |

FOREIGN PATENT DOCUMENTS

GB 2292287 A 2/1996  
WO 9824215 6/1998

OTHER PUBLICATIONS

PCT International Search Report Dated Apr. 22, 2009.

* cited by examiner

*Primary Examiner* — John Lee

(57) ABSTRACT

A portable radio and battery pack configuration favoring higher available transmit power in explosive atmosphere applications includes a radio device (302) and a battery pack (304) removably attached to the radio device. The battery pack includes at least one of an audio power amplifier (346) and a radio frequency (RF) power amplifier (356), and a battery (306) for supplying power to the radio device and to the at least one of an audio power amplifier and a RF power amplifier.

11 Claims, 7 Drawing Sheets

501

PORTABLE RADIO AND BATTERY PACK CONFIGURATION

FIELD OF THE INVENTION

The present invention generally relates to the field of radio communication, and more particularly relates to an intrinsically-safe portable radio system.

BACKGROUND OF THE INVENTION

Portable radio systems are sometimes used in potentially explosive atmospheres. A portable radio system used in potentially explosive atmospheres should be designed to meet the safety standards of Directive 94/9/EC of the European Parliament and the Council of the European Union, commonly referred to as ATEX, which is derived from the French words ATmosphères EXplosibles. A portable radio system that meets the ATEX standards may be referred to as having an "intrinsically safe" rating. A portable radio system that has an intrinsically-safe rating is less likely to ignite an explosive atmosphere while operating within such an environment.

FIG. 1 is a cut-away, perspective view 100 of a simplified diagram of a known portable radio system 101. The known portable radio system 101 includes a known radio device 102 and a known battery pack 104. The known battery pack 104 includes a battery 106 and a current-limiting protection circuit 108. The known battery pack 104 has an interface system 110 for coupling with a complementary interface system (not shown) on the known radio device 102. The interface system 110 comprises a logic contact 111, and direct current (DC) power supply contacts including a positive contact 112 and a negative contact 114. The positive contact 112 and the negative contact 114 are connected, within the known battery pack 104, to positive and negative terminals, respectively, of the battery 106. The known radio device 102 also includes a display 122, a keypad 124, a channel select knob 126, a volume control knob 128, an antenna 132, an audio power amplifier 146, a speaker 148, a radio frequency power amplifier 156 and other electronics (not shown).

With an intrinsically-safe radio system, any short circuit electrical energy exposed to an explosive atmosphere should not cause ignition. Sparking at the DC power supply contacts should be limited to a sufficiently low energy so that the explosive atmosphere will not ignite even when component faults and/or short circuits exist in the known portable radio system 101. Sparking at the DC power supply contacts of the interface system 110 can occur if the known portable radio system 101 is dropped in an explosive environment, or when the known radio device 102 and the known battery pack 104 are disconnected or re-connected from each other in an explosive environment. A sparking current as low as 1.5-amps can have enough energy to ignite an explosive atmosphere.

A known method of limiting short circuit electrical energy utilizes a fast current-limiting protection circuit 108 to limit current to less than approximately 1-amp under contact short circuit conditions, thereby reducing the probability of occurrence of an igniting energy "let through". The phrase "contact short circuit" means any current path between the contacts that may result in sufficient energy to cause an ignition. The term "let through" means the amount of energy that is available at the contacts before the current-limiting protection circuit can interrupt or reduce the contact current. However, there is at least one disadvantage to circuits that limit igniting energy. To sufficiently limit available short circuit igniting energy, a current limiting threshold should be relatively low and also extremely fast. However, a normally operating known radio device 102 may demand a high peak DC current from the battery pack 104 for proper functioning of a radio transmitter. Typically, a transmitter within the radio device 102 requires 1.0-amp to 1.8-amp, depending upon capacitance. The let through energy limitations for preventing ignition, and the let through energy capability for fully supporting normal radio transmitting, may overlap and, as a result, be troublesome. This overlap becomes more troublesome when practical complex circuit tolerances are taken into account. The conflicting requirements of energy limitations for preventing ignition, and energy capability for fully supporting normal radio transmitting, result in compromises in radio design performance, including limiting transmitter output RF power to undesirably low levels. A current-limiting protection circuit should have a low energy trip threshold to prevent ignition. The current-limiting protection circuit should have a high energy trip threshold to support radio transmissions under full power. The performance of a portable radio system may be degraded in an attempt to prevent overlap of these two requirements.

A known solution to this problem is making the circuit tolerances as small as possible, and optimizing the radio circuit current demand to be as low as possible, especially under transmit peak power situations. However, even with these efforts, the let through energy limitations to prevent ignition, and the let through energy capability to fully support normal radio transmitting overlap, and, as a result, sub-optimal performance occurs.

FIG. 2 is a simplified function block diagram 200 of the known portable radio system 101. The known radio device 102 comprises a receiver 140 and a transmitter 150. The receiver 140 and the transmitter 150 are coupled to a transmit/receive switch 134. The transmit/receive switch 134 is coupled to the antenna 132. The other electronics 160 of the known radio device 102 includes receiver circuits 142, an audio synthesis audio driver 144, a carrier synthesis circuit 152, a modulator and radio frequency driver 154, a microprocessor 170, circuits 172 associated with the display 122, circuits 174 associated with the keypad 124, and circuits 176 associated with accessories (not shown). In FIG. 2, the positive contact 112 and the negative contact 114 of the known battery pack 104 are shown coupled to a positive contact 182 and a negative contact 184, respectively, of the known radio device 102.

Therefore a need exists to overcome the problems with the prior art as discussed above.

SUMMARY OF THE INVENTION

Briefly, in accordance with the present invention, disclosed is a portable radio system that includes a radio device, and a battery pack removably attached to the radio device. The battery pack includes an RF power amplifier for increasing power of a signal from the radio device, and a battery for supplying power to the RF power amplifier and to the radio device.

In another embodiment, disclosed is a battery pack that includes one of an RF power amplifier and an audio power amplifier, a battery coupled to the one of the RF power amplifier and the audio power amplifier, and an interface system coupled to the battery. The interface system includes a DC power supply interface for supply DC power from the battery pack to a radio device that is separate from, and removably attachable to, the battery pack.

In yet another embodiment, disclosed is a transmitter that includes an RF driver in a radio device, an RF power amplifier in a battery pack, and means at the radio device for removably attaching the radio device to the battery pack. The RF power amplifier is for increasing power of a signal from the RF driver. The battery pack is separate from the radio device.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term coupled, as used herein, is defined as connected, although not necessarily directly, and not necessarily mechanically.

The term "portable radio system" is intended to broadly cover many different types of devices that can wirelessly transmit signals, and optionally can wirelessly receive signals, and may also operate in conjunction with a wireless communication system. For example, and not for any limitation, a portable radio system can include any one or a combination of the following: a two-way radio, mobile telephone, a wireless telephone, a cellular telephone, a cordless telephone, a two-way pager, a wireless messaging device, a laptop/computer, an automotive gateway, a residential gateway, and a wireless interface card.

Figure 1:
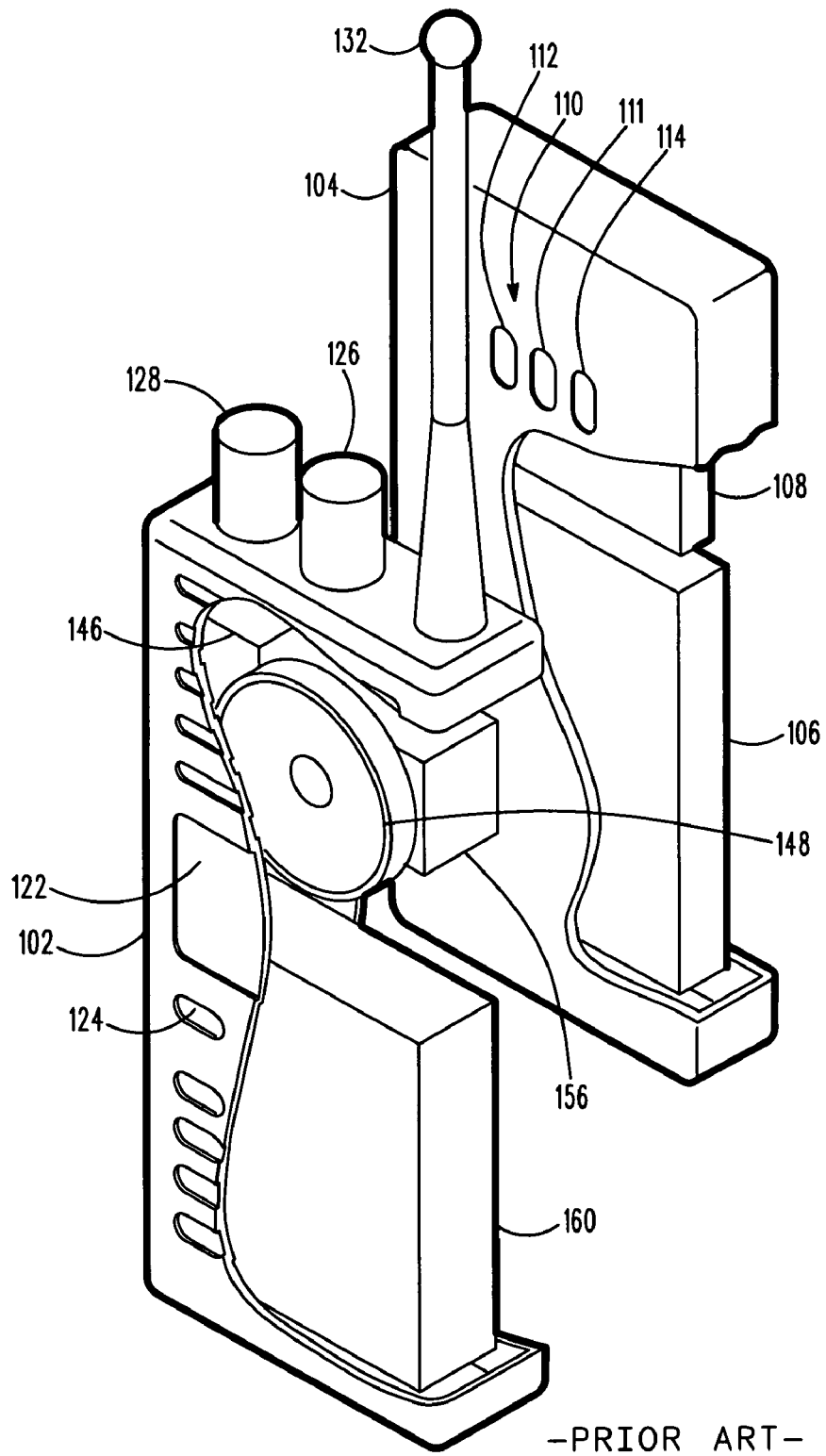
FIG. 1 is a cut-away, perspective view of a simplified diagram of a known portable radio system including a known radio device and a known battery pack.
Figure 2:
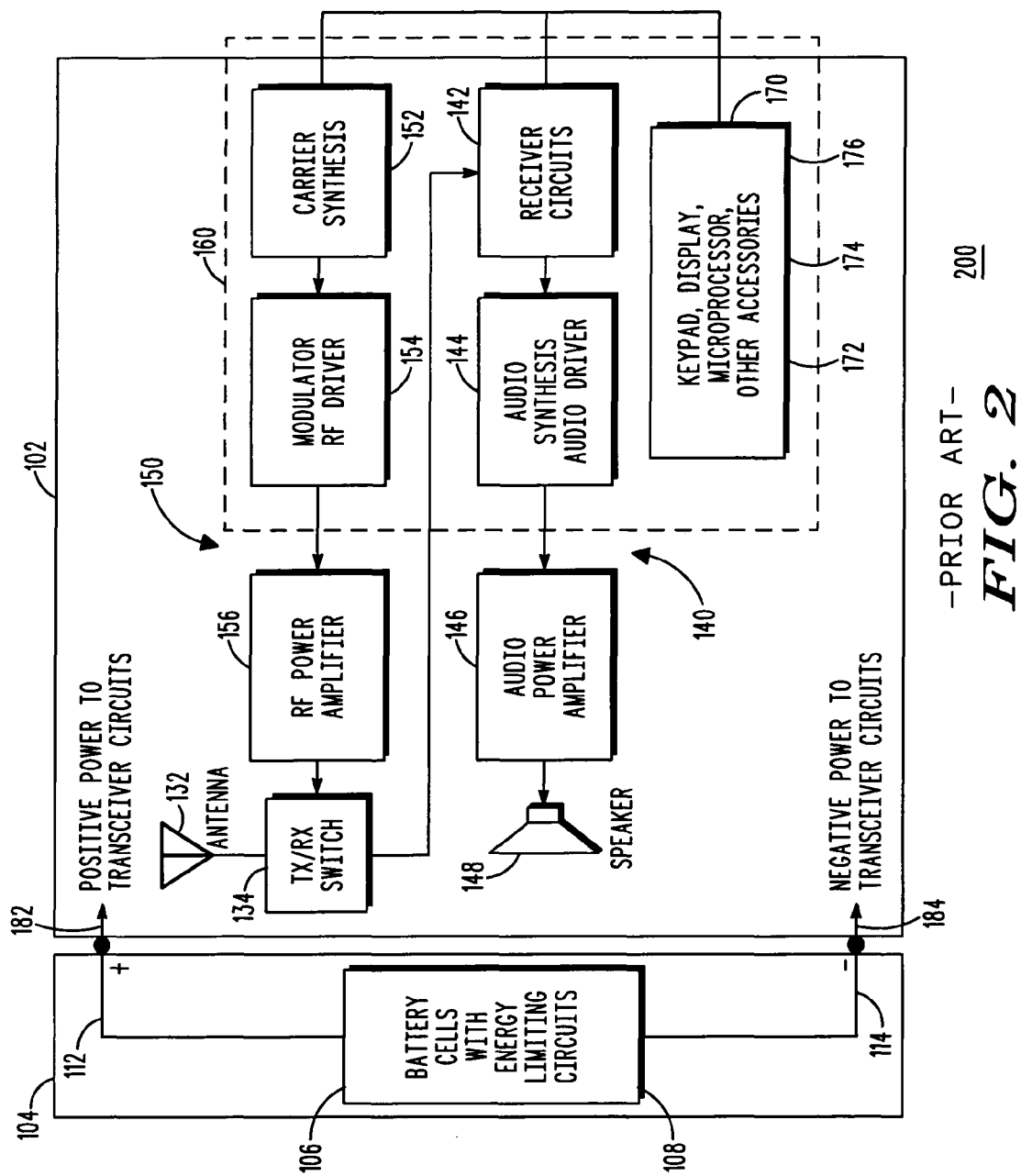
FIG. 2 is a simplified function block diagram of the known portable radio system of FIG. 1.
Figure 3:
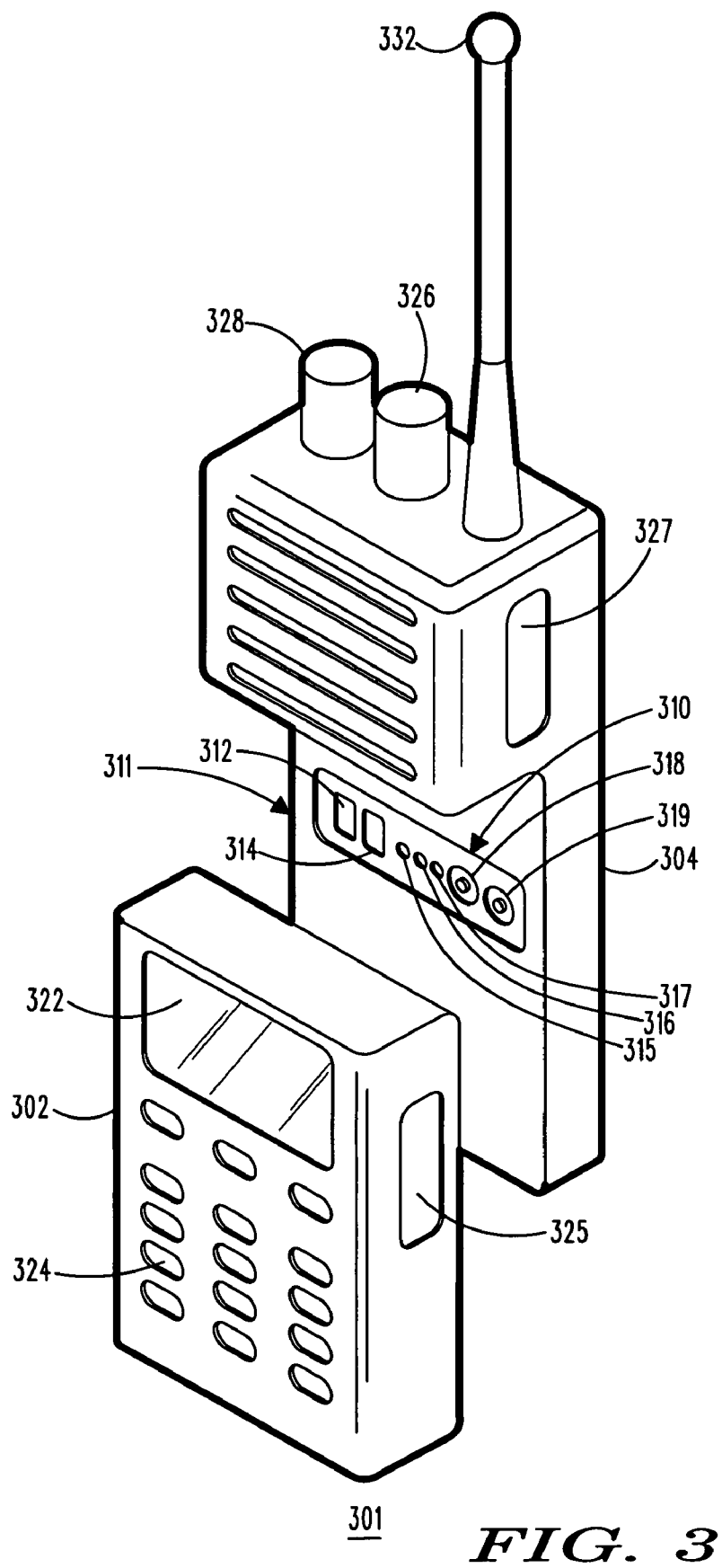
FIG. 3 is a perspective view of a simplified diagram of a portable radio system in accordance with the invention, including a radio device and a battery pack.

FIG. 3 is a perspective view of a simplified diagram of a portable radio system 301 in accordance with the invention. The portable radio system 301 comprises a radio device 302 and a battery pack 304. The battery pack 304 is removably attachable to the radio device 302. In FIG. 3, the battery pack 304 is shown detached from the radio device 302. The radio device 302 comprises a display 322, a keypad 324, an accessory port 325 and other electronics (not shown). In portable radio power systems, there are only a few components that require high peak DC power. The circuit components that demand a high peak input DC power are a radio frequency (RF) power amplifier that supplies RF power to an antenna, and an audio power amplifier that supplies audio power to a speaker. Advantageously, the radio device 302 includes neither an audio power amplifier, nor an RF power amplifier, and, as a result, the radio device 302 draws less current than do known radio devices, including known radio device 102.

The battery pack 304 comprises a battery 306 (see FIG. 4), an antenna 332, a channel select knob 326, and a volume control knob 328. The battery pack 304 has an interface system 310 for detachably coupling with a complementary interface system (see FIG. 5) on the radio device 302. The interface system 310 comprises a DC power supply interface 311 (which includes a positive contact 312 and a negative contact 314), logic interfaces 315, 316 and 317, a coaxial interface 318, and another coaxial interface 319. The positive contact 312 and the negative contact 314 of the interface system 310 of the battery pack 304 are connected, within the battery pack, to corresponding terminals of the battery 306. The complementary interface system of the radio device 302 has interfaces (see FIG. 5) that correspond to the positive contact 312, the negative contact 314, the logic interfaces 315, 316 and 317, the coaxial interface 318, and the other coaxial interface 319 of the battery pack 304. When the radio device 302 and the battery pack 304 are mechanically attached together, the interface system 310 of the battery pack 304 and the complimentary interface system of the radio device 302 mate together.

Figure 4:
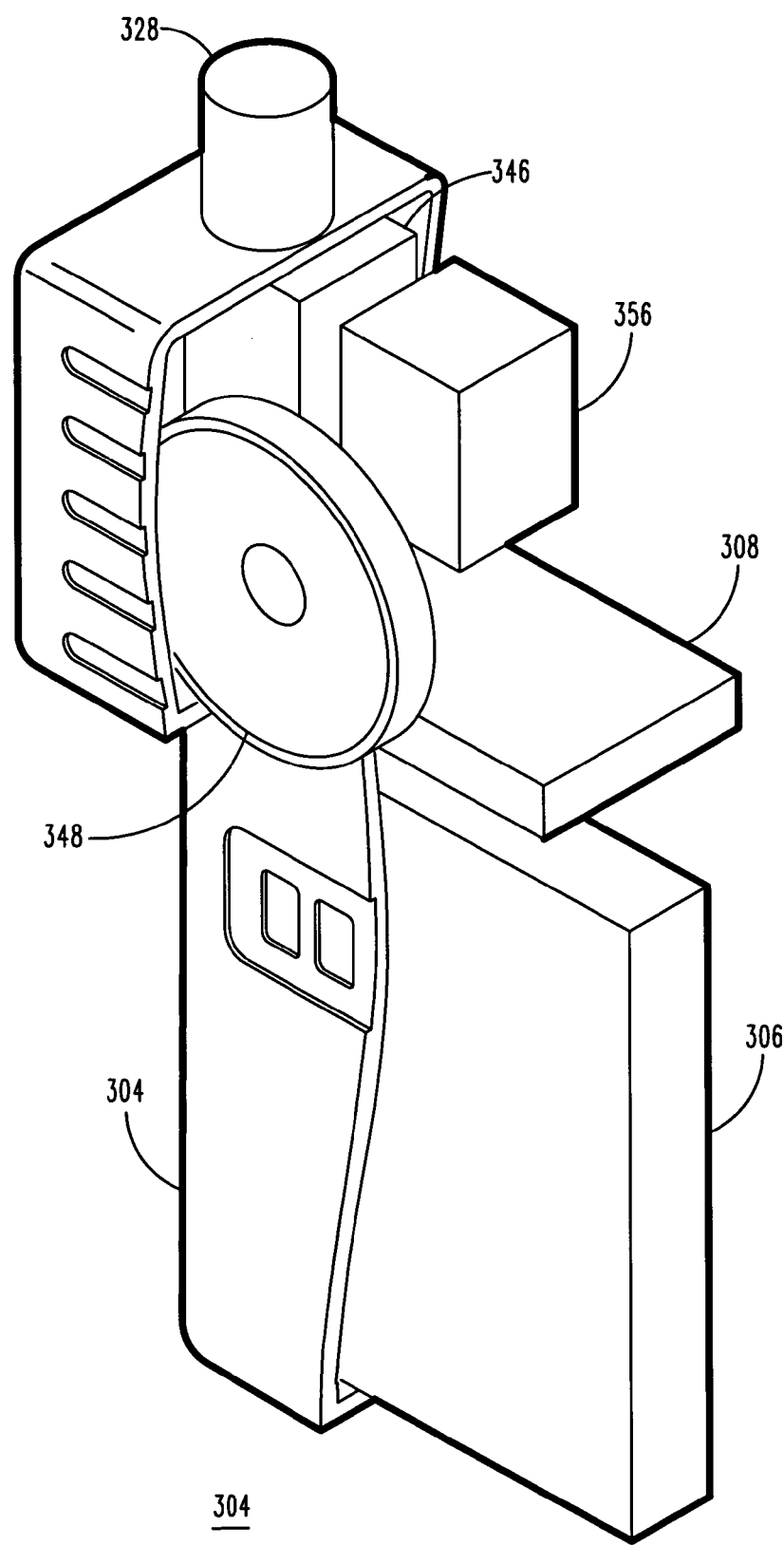
FIG. 4 is a cut-away view of the simplified diagram of the battery pack of FIG. 3.

FIG. 4 is a cut-away view of the simplified diagram of the battery pack 304, in which can be seen the battery 306. The term "battery" as used herein includes both a single cell battery and a multiple cell battery. The term "cell" as used herein includes any type of electrochemical cell including an electrolytic cell, a galvanic cell, a voltaic cell, a fuel cell and a flow cell. The battery pack 304 also comprises a current-limiting protection circuit 308 coupled to the battery 306. The current-limiting protection circuit 308 senses abnormal current levels, and sufficiently limits and reduces the contact current and let through energy to prevent any ignition. A current-limiting protection circuit is described in U.S. Pat. No. 7,145,313 entitled "BATTERY PROTECTION CIRCUIT FOR SIMULATING AN OVERCURRENT CONDITION BASED ON BATTERY CURRENT FLOW", issued Dec. 5, 2006, to Geren et al., which is hereby fully incorporated herein by reference.

The battery pack 304, according to the present example, further comprises a speaker 348, an audio power amplifier 346 coupled to the battery 306 and to the speaker 348, a RF power amplifier 356 coupled to the battery 306 and to the antenna 332, and another accessory port 327. The coaxial interface 318 is coupled, within the battery pack 304, to an input 355 (see FIG. 5) of the RF power amplifier 356. The input 355 of the RF power amplifier 356 (see FIG. 5) receives a modulated signal from the radio device 302 through coaxial interface 368 of the radio device 302. The coaxial interface 319 of the battery pack 304 is coupled, by means of a connection within the battery pack, to the antenna 332. A corresponding coaxial interface 369 (see FIG. 5) on the radio device 302 mates with the coaxial interface 319 on the battery pack 304. The logic interface 317 of the battery pack 304 mates with a logic interface 367 of the radio device 302. As a result of the audio power amplifier 346 and the RF power amplifier 356 being disposed in the battery pack 304 rather than in the radio device 302, less current flows through the positive contact 312 and the negative contact 314 of the battery pack (and less current flows through positive and negative contacts that mate respectively therewith, on the radio device) than flows between known battery packs and known radio devices. As a result of less current flowing between the radio device 302 and the battery pack 304, the likelihood of a spark occurring at the interface system 310 between the radio device 302 and the battery pack 304 is reduced, and consequently the likelihood of igniting an explosive atmosphere is reduced.

Figure 5:
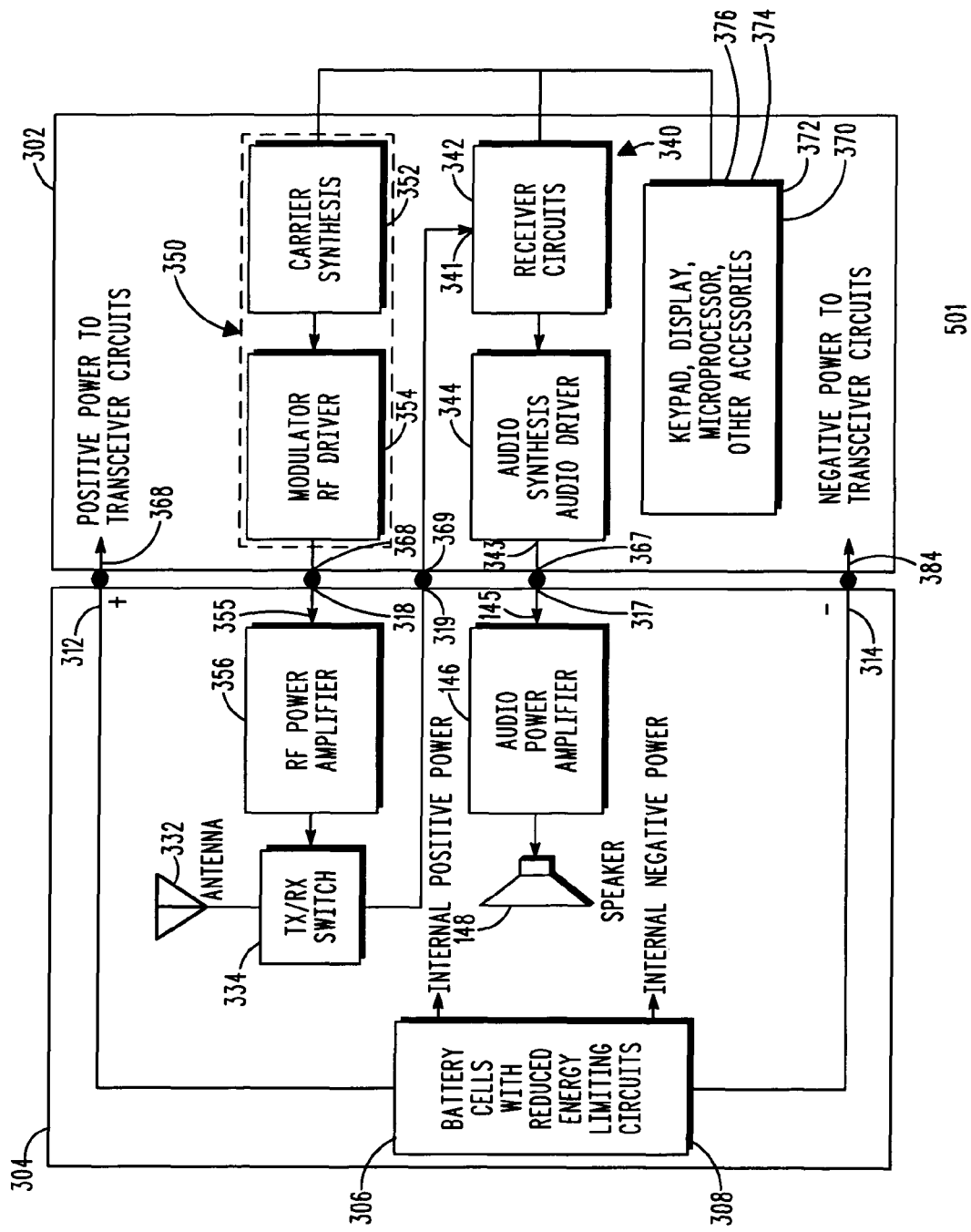
FIG. 5 is a simplified function block diagram of the portable radio system of FIG. 3.

FIG. 5 is a simplified function block diagram 501 of the portable radio system 301. According to the present example, the radio device 302 comprises a receiver 340 and a transmitter 350. The receiver 340 and the transmitter 350 are coupled to a transmit/receive switch 334. The radio device 302 includes receiver circuits 342, an audio synthesis audio driver 344, a carrier synthesis circuit 352, a modulator and radio frequency driver 354, a microprocessor 370, circuits 372 associated with the display 322, circuits 374 associated with the keypad 324, and circuits 376 associated with accessories (not shown). The complimentary interface system of the radio device 302 comprises the logic interface 367, the coaxial interface 368, the other coaxial interface 369, and a DC power supply interface including a positive contact 382 and a negative contact 384. In FIG. 5, the positive contact 312 and the negative contact 314 of the battery pack 304 are shown coupled to the positive contact 382 and the negative contact 384, respectively, of the radio device 302. The other coaxial interface 369 of the radio device 302, which mates with the other coaxial interface 319 of the battery pack 304, is coupled within the radio device 302, to an input of the receiver circuits 342. The input of the receiver circuits 342 receives RF signals from the antenna 332 on the battery pack 304 through coaxial interface 369. An output 343 of the audio synthesis audio driver 344 is coupled to an input 145 of the audio power amplifier 146 via logic interface 317 on the battery pack 304 and via the interface 367 on the radio device 302. The logic interfaces 315 and 316 (see FIG. 3) on the interface system 310 of the battery pack 304 are used for various control purposes, for example, but not limited to, the following: adjusting the power amplifier gain, and adjusting the audio amplifier gain.

Figure 6:
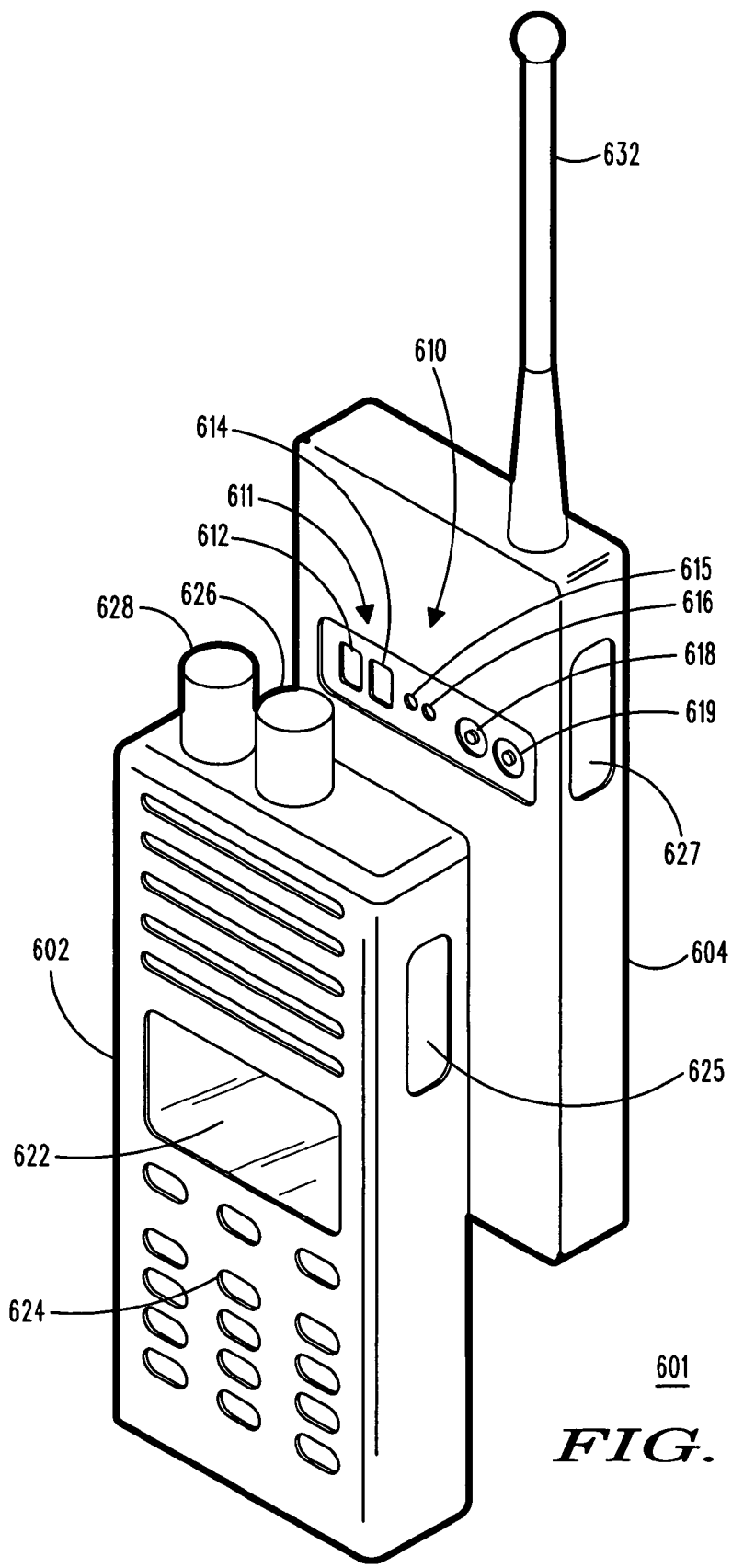
FIG. 6 is a perspective view of a simplified diagram of an alternative embodiment of the portable radio system, including an alternative embodiment of the radio device and an alternative embodiment of the battery pack.

FIG. 6 is a perspective view of a simplified diagram of an alternative embodiment of the portable radio system 601, including an alternative embodiment of the radio device 602 and an alternative embodiment of the battery pack 604. The alternative embodiment of the battery pack 604 is removably attachable to the alternative embodiment of the radio device 602. In FIG. 6, the alternative embodiment of the battery pack 604 and the alternative embodiment of the radio device 602 are shown not attached to each other. The alternative embodiment of the radio device 602 comprises a display 622, a keypad 624, an accessory port 625, a channel select knob 626, a volume control knob 628, an audio power amplifier (not shown), a speaker (not shown) and other electronics (not shown). Advantageously, the alternative embodiment of the radio device 602 does not include an RF power amplifier. The components of the alternative embodiment of the radio device 602 serve the same functions as do similarly-named components of the radio device 302; therefore, such components of the alternative embodiment of the radio device 602 are not described in further detail.

The alternative embodiment of the battery pack comprises a battery 606 (see FIG. 7), an antenna 632, and another accessory port 627. The alternative embodiment of the battery pack 604 has an interface system 610 for detachably coupling with a complementary interface system (not shown) on the alternative embodiment of the radio device 602. The interface system 610 comprises a DC power supply interface 611 (which includes a positive contact 612 and a negative contact 614), logic interfaces 615 and 616, a coaxial interface 618, and the other coaxial interface 619. The logic interfaces 615 and 616 (see FIG. 6) on the interface system 610 of the battery pack 604 are used for various control purposes, for example, but not limited to, the following: adjusting the power amplifier gain, and adjusting the audio amplifier gain. The components of the alternative embodiment of the battery pack 604 serve the same functions as do similarly-named components of the battery pack 304; therefore, such components of the alternative embodiment of the battery pack 304 are not described in further detail.

Figure 7:
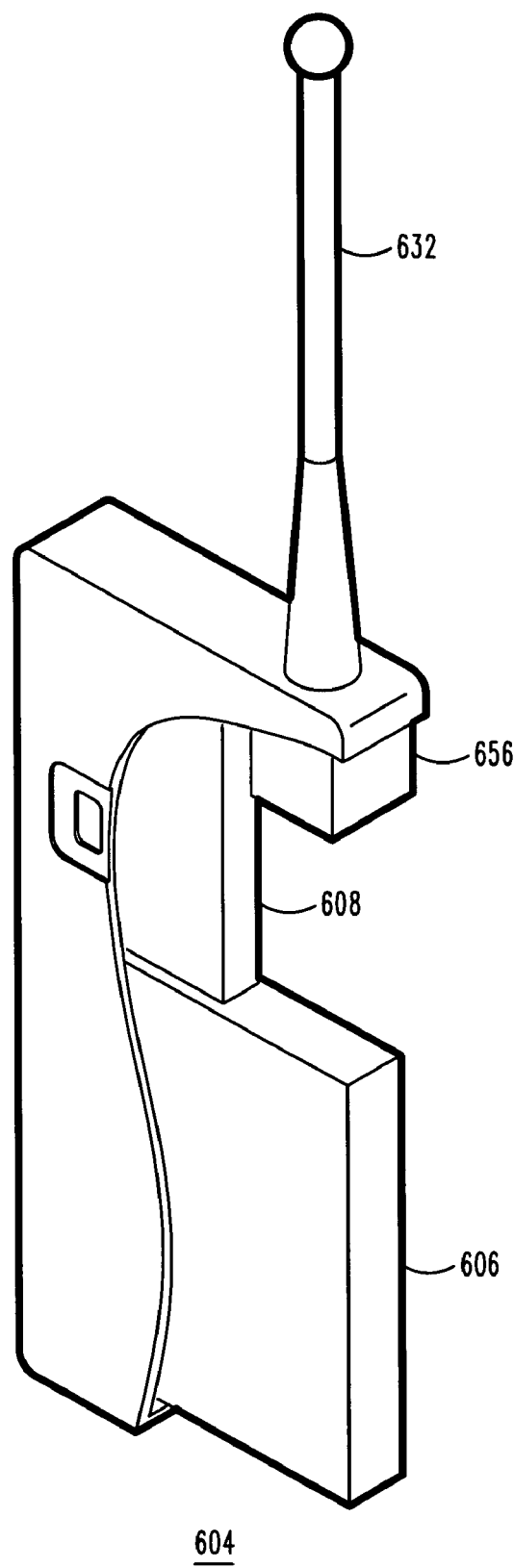
FIG. 7 is a cut-away view of the simplified diagram of the alternative embodiment of the battery pack of FIG. 6.

FIG. 7 is a cut-away view of the simplified diagram of the alternative embodiment of the battery pack 604, in which can be seen the battery 606. The alternative embodiment of the battery pack 604 also comprises a current-limiting protection circuit 608 coupled to the battery 606, and an RF power amplifier 656 coupled to the current-limiting protection circuit 608 and to the antenna 632.

The portable radio system 301 in accordance with the invention eliminates performance restriction problems of known portable radio systems. By re-distributing peak power demanding components between the battery pack 304 and radio device 302, peak current and peak "let through" energy limits at the interface system 310 are reduced. Other re-distributions of power demanding components between the battery pack 304 and radio device 302 are foreseeable.

As a result of redistributing peak power components to the battery pack 304, the interface system 310 of the battery pack 304 has additional interfaces compared with known battery-pack-to-radio device interface systems, such as interface system 110. These additional interfaces include, but are not limited to, interfaces for audio signals, RF signals, modulation signals and control signals. Various embodiments of the portable radio system 301 use one or more of the following technologies for managing the additional interfaces across the battery pack-to-radio device boundary: a) direct electrical connection of electrical contacts may be used for any of these signal; b) RF signals may be coupled wirelessly through air, for example, using closely coupled coils or closely coupled waveguides; c) audio, modulation and control signals may be coupled wirelessly using short range wireless, such as Bluetooth®; d) audio signals may be wirelessly ported across the interface 310 using closely coupled audio "pipelines", using, for example, inductive or capacitive coupling; and e) signals may be coupled by modulation of light beams across the interface. Other interface coupling technologies are foreseeable. The portable radio system 301 anticipates any combination of disposing power demanding components in the battery pack 304 and using the various interface coupling technologies.

By reconfiguring the portable radio system 301 so that the RF power amplifier 356 and/or the audio power amplifier 346 do not burden the battery pack-to-radio device DC power supply interface 311, the peak power required at the DC power supply interface is reduced significantly. The peak currents required by the RF power amplifier 356 and/or the audio power amplifier 346 are provided by the battery 306 and safety circuit 308 within the battery pack 304. This is done without the peak DC power crossing an external boundary of the radio device 302. As a result of this new distribution of components within the portable radio system 301, the peak-to-average power requirements at the DC power supply interface 311 are reduced. The portable radio system 301 resolves a problematic conflict between peak power requirements and ignition energy requirements of known portable radio systems. For example, in the typical known portable radio system 101, the peak current at the interface system 110 can be as much as 2.5-amps. This large peak current is too high a value to ensure that ignition of an explosive atmosphere will not occur if the contacts electrically short. However, with the portable radio system 301, the peak current at the interface system 310 is typically a maximum of only 0.5-amps. This is well within a reasonable range to protect against ignition, using high-speed current-limiting circuits. With the portable radio system 301, peak current at the interface system 310 is advantageously reduced by a factor of five (5), without reducing RF or audio power output performance. The RF power amplifier 356 and audio power amplifier 346 represent only a small portion of the total cost of the portable radio system 301. The audio power amplifier 346 and the RF power amplifier 356 are expendable with a relatively low cost burden. Therefore, when the battery pack 304, which includes the audio power amplifier 346 and the RF power amplifier 356, is replaced, the replacement cost burden is not great.

The power RF amplifier 356 draws about 2.0-amps. The audio power amplifier 346 draws about 0.4-amps. Other circuits and accessories draw about 1.6-amps. For example, the microprocessor draws about 250-milliamps to 500-milliamps, the backlighting of the display draws about 200-milliamps to 300-milliamps, and an optional "man-down" feature draws about 460-milliamps. Alternatively, the portable radio system 301 includes a built-in flashlight and a color, rather than a monochrome, display. Advantageously, the portable radio system 301 can draw up to about 4.0-amps with minimal probability of occurrence of an igniting energy let through.

Advantageously, the current-limiting protection circuit 308 in accordance with the invention can be simpler, and therefore can draw less current, than known current-limiting protection circuits, such as the current-limiting protection circuit 108 of the known battery pack 104. The current-limiting protection circuit 308 is simpler than the current-limiting protection circuit 108 of the known battery pack 104 because the radio device 302, which does not include the RF power amplifier 356, draws less current than a known radio device, such as the known radio device 102.

The portable radio system 301 can be used with an ATEX portable radio and with similar safety-related products where short circuit energy should be limited to prevent ignition or fire in sensitive usage environments.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A portable radio system, comprising:
   a radio device; and
   a battery pack removably attached to the radio device, the battery pack including a radio frequency (RF) power amplifier for increasing power of a signal coupled to an input of the RF power amplifier, and a battery for supplying power to the RF power amplifier and to the radio device, wherein the radio device includes receiver circuits and transmitter circuits, and wherein the transmitter circuits do not include an RF power amplifier, and wherein the battery pack includes a coupling system for detachably coupling the RF power amplifier in the battery pack to the transmitter circuits in the radio device.

2. The portable radio system of claim 1, wherein the battery pack includes an antenna interface coupled to the RF power amplifier.

3. The portable radio system of claim 2, wherein the battery pack includes an antenna coupled to the antenna interface.

4. The portable radio system of claim 1, wherein the means for coupling includes a coaxial interface.

5. The portable radio system of claim 1, wherein the battery pack includes an audio power amplifier coupled to the battery and a speaker coupled to the audio power amplifier.

6. The portable radio system of claim 5, wherein the battery pack includes means for coupling the audio power amplifier in the battery pack to the receiver circuits in the radio device.

7. The portable radio system of claim 5, wherein the radio device includes means for coupling the receiver circuits in the radio device to the audio power amplifier in the battery pack.

8. A portable radio system, comprising:
   a radio device; and
   a battery pack removably attached to the radio device, the battery pack including a radio frequency (RF) power amplifier for increasing power of a signal coupled to an input of the RF power amplifier, and a battery for supplying power to the RF power amplifier and to the radio device wherein the radio device includes receiver circuits and transmitter circuits, and wherein the transmitter circuits do not include an RF power amplifier, and wherein the radio device includes a complementary coupling system for detachably coupling the transmitter circuits in the radio device to the RF power amplifier in the battery pack.

9. The portable radio system of claim 8, wherein the means for coupling includes a coaxial interface.

10. A portable radio system, comprising:
    a radio device; and
    a battery pack removably attached to the radio device, the battery pack including a radio frequency (RF) power amplifier for increasing power of a signal coupled to an input of the RF power amplifier, and a battery for supplying power to the RF power amplifier and to the radio device; and
    the radio device including a receiver and a transmitter, the transmitter further including transmitter circuits and an RF power amplifier, the receiver further including receiver circuits and an audio power amplifier, and wherein the battery pack includes the RF power amplifier and the audio power amplifier.

11. A transmitter, comprising:
    a radio frequency (RF) driver in a radio device;
    an RF power amplifier in a battery pack, the RF power amplifier for increasing power of a signal from the RF driver, the battery pack being separate from the radio device; and
    means at the radio device for removably attaching the radio device to the battery pack; and
    means at the battery pack, for detachably coupling the RF power amplifier to the RF driver.

* * * * *